(12) United States Patent
Huang-Fu et al.

(10) Patent No.: US 11,039,361 B2
(45) Date of Patent: Jun. 15, 2021

(54) ENHANCED 5GSM STATE MAPPING WHEN INTERWORKING

(71) Applicant: MEDIATEK INC., Hsin-Chu (TW)

(72) Inventors: Chien-Chun Huang-Fu, Hsin-Chu (TW); Yu-Chieh Tien, Hsin-Chu (TW); Shang-Ru Mo, Hsin-Chu (TW); Chi-Hsien Chen, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 135 days.

(21) Appl. No.: 16/532,615

(22) Filed: Aug. 6, 2019

(65) Prior Publication Data

US 2020/0053819 A1  Feb. 13, 2020

Related U.S. Application Data

(60) Provisional application No. 62/717,352, filed on Aug. 10, 2018.

(51) Int. Cl.
*H04W 36/14* (2009.01)
*H04W 76/20* (2018.01)
(Continued)

(52) U.S. Cl.
CPC ............ *H04W 36/14* (2013.01); *H04W 76/11* (2018.02); *H04W 76/20* (2018.02); *H04L 45/306* (2013.01); *H04L 47/20* (2013.01); *H04L 65/1003* (2013.01); *H04L 67/141* (2013.01); *H04L 67/146* (2013.01); *H04L 67/148* (2013.01); *H04W 28/0215* (2013.01); *H04W 28/0252* (2013.01); *H04W 28/0268* (2013.01); *H04W 28/04* (2013.01);
(Continued)

(58) Field of Classification Search
CPC ......... H04W 36/0011; H04W 36/0022; H04W 36/0033; H04W 36/14; H04W 76/11; H04W 76/20; H04W 76/27
See application file for complete search history.

(56) References Cited

U.S. PATENT DOCUMENTS

2004/0109466 A1  6/2004  Van Ackere et al. ......... 370/419
2008/0192925 A1  8/2008  Sachs et al. .................... 380/29
(Continued)

FOREIGN PATENT DOCUMENTS

CN  101895966 A  7/2010
CN  102724736 A  6/2012
(Continued)

OTHER PUBLICATIONS

Taiwan IPO, office action for the TW patent application 108127878 (no English translation is available) dated Apr. 17, 2020 (7 pages).
(Continued)

*Primary Examiner* — Kevin C. Harper
(74) *Attorney, Agent, or Firm* — Imperium Patent Works; Zheng Jin

(57) ABSTRACT

A method of 5G session management (5GSM) state mapping is proposed when interworking. For each PDU session in 5GSM state of PDU SESSION active, PDU SESSION MODIFICATION PENDING, or PDU SESSION INACTIVE PENDING, UE maps the PDU session to a PDN connection in 4G ESM state BEARER CONTEXT ACTIVE. For any other PDU session in 5GSM state of PDU SESSION inactive, or PDU SESSION ACTIVE PENDING, UE maps the PDU session to a PDN connection in 4G ESM state BEARER CONTEXT INACTIVE.

20 Claims, 4 Drawing Sheets

(51) Int. Cl.

| | | |
|---|---|---|
| *H04W 76/11* | (2018.01) | |
| *H04W 40/02* | (2009.01) | |
| *H04W 48/12* | (2009.01) | |
| *H04L 12/813* | (2013.01) | |
| *H04L 29/06* | (2006.01) | |
| *H04L 12/725* | (2013.01) | |
| *H04W 28/02* | (2009.01) | |
| *H04W 28/12* | (2009.01) | |
| *H04W 36/00* | (2009.01) | |
| *H04W 68/02* | (2009.01) | |
| *H04W 76/27* | (2018.01) | |
| *H04L 29/08* | (2006.01) | |
| *H04W 28/04* | (2009.01) | |
| *H04W 36/08* | (2009.01) | |
| *H04W 48/18* | (2009.01) | |
| *H04W 84/04* | (2009.01) | |

(52) U.S. Cl.
CPC ........ *H04W 28/12* (2013.01); *H04W 36/0022* (2013.01); *H04W 36/08* (2013.01); *H04W 40/02* (2013.01); *H04W 48/12* (2013.01); *H04W 48/18* (2013.01); *H04W 68/02* (2013.01); *H04W 76/27* (2018.02); *H04W 84/042* (2013.01)

(56) References Cited

U.S. PATENT DOCUMENTS

| | | | |
|---|---|---|---|
| 2010/0234016 A1 | 9/2010 | Palanki et al. | 455/424 |
| 2011/0096660 A1 | 4/2011 | Ikeda et al. | 370/225 |
| 2012/0082132 A1 | 4/2012 | Andreasen et al. | 370/331 |
| 2014/0112150 A1 | 4/2014 | Ko et al. | 370/236 |
| 2014/0241264 A1 | 8/2014 | Liu | 370/329 |
| 2015/0296431 A1 | 10/2015 | Li et al. | 370/331 |
| 2015/0351021 A1 | 12/2015 | Zhang et al. | 455/432.1 |
| 2017/0135005 A1 | 5/2017 | Basu Mallick et al. | 455/434 |
| 2017/0339609 A1 | 11/2017 | Youn et al. | |
| 2018/0048537 A1 | 2/2018 | Gaikwad et al. | |
| 2018/0049218 A1 | 2/2018 | Hapsari et al. | |
| 2018/0070276 A1 | 3/2018 | Wu | |
| 2018/0220290 A1 | 8/2018 | Sivavakeesar | |
| 2018/0220338 A1 | 8/2018 | Tabe et al. | |
| 2018/0220344 A1 | 8/2018 | Shaheen | |
| 2018/0279214 A1 | 9/2018 | Chandramouli et al. | |
| 2018/0288654 A1 | 10/2018 | Shin et al. | |
| 2018/0324577 A1 | 11/2018 | Faccin et al. | |
| 2019/0029057 A1 | 1/2019 | Pan et al. | |
| 2019/0053308 A1 | 2/2019 | Castellanos Zamora et al. | |
| 2019/0166647 A1 | 5/2019 | Velev et al. | |
| 2019/0174573 A1 | 6/2019 | Velev et al. | |
| 2019/0223060 A1 | 7/2019 | Zhou et al. | |
| 2019/0253870 A1 | 8/2019 | Ronneke et al. | |
| 2019/0289506 A1 | 9/2019 | Park et al. | |
| 2019/0313310 A1 | 10/2019 | Won et al. | |
| 2020/0053562 A1 | 2/2020 | Kim et al. | |
| 2020/0053642 A1 | 2/2020 | Huang Fu et al. | |
| 2020/0154389 A1 | 5/2020 | Karampatsis et al. | |
| 2020/0178196 A1 | 6/2020 | Wang et al. | |

FOREIGN PATENT DOCUMENTS

| | | |
|---|---|---|
| CN | 103517325 A | 6/2012 |
| CN | 107925862 A | 8/2015 |
| CN | 107592331 A | 7/2016 |
| CN | 107690161 A | 8/2016 |
| CN | 108307449 A | 8/2016 |
| EP | 3557905 A1 | 12/2016 |
| WO | WO2014114525 A1 | 1/2014 |
| WO | WO2018034337 A1 | 8/2016 |
| WO | WO2018065060 A1 | 10/2016 |
| WO | WO2018070436 A1 | 10/2016 |
| WO | WO2018111029 A1 | 12/2016 |

OTHER PUBLICATIONS

C1-173817 3GPP TSG-CT WG1 Meeting #106, Ericsson et al, "5G QoS-errors in QoS rules IE", Kochi, India, Oct. 23-27, 2017 (19 pages) *sections 9, 12*.

C1-184425 3GPP TSG-CT WG1 Meeting #111bis, MediaTek Inc., "Exception handling in QoS operation", Sophia-Antipolis, France, Jul. 9-13, 2018 (8 pages). *section 6*.

Taiwan IPO, office action for the TW patent application 108128520 (no English translation is available) dated Apr. 24, 2020 (6 pages).

3GPP TS 23.503 V1.0.0 (Dec. 2017), 3rd Generation Partnership Project; Technical Specification Group Services and System Aspects; Policy and Charging Control Framework for the 5G System; Stage 2 (Release 15) *see 4.2.2, 6.1.2.2, 6.2.2*.

Taiwan IPO, office action for the TW patent application 108128251 (no English translation is available) dated Mar. 31, 2020 (6 pages).

3GPP TS 24.501 V15.0.0 (Jun. 2018), 3rd Generation Partnership Project; Technical Specification Group Core Network and Terminals; Non-Access-Stratum (NAS) protocol for 5G System (5GS); Stage 3 (Release 15), *section 4.4.2, 6.1-6.2.3, 8.3.9.1, 9.10.3-4*.

International Search Report and Written Opinion of International Search Authority for PCT/CN2019/099889 dated Oct. 31, 2019 (9 pages).

3GPP TS 24.501 v15.0.0 (Jun. 2018), 3rd Generation Partnership Project; Technical Specification Group Core Network and Terminals; Non-Access-Stratum (NAS) protocol for 5G System (5GS); Stage 3 (Release 15) *clause 6.1 to 6.2.3*.

International Search Report and Written Opinion of International Search Authority for PCT/CN2019/099719 dated Oct. 31, 2019 (9 pages).

C1-184425 3GPP TSG-CT WG1 Meeting #111 bis, MediaTek Inc., "Exception handling in QoS operation", Sophia-Antipolis, France, Jul. 9-13, 2018 (8 pages).

C1-184614 3GPP TSG CT WG1 Meeting #111 bis, MediaTek Inc., "Exception handling in QoS operation", Sophia-Antipolis, France, Jul. 9-13, 2018 (7 pages).

Taiwan IPO, office action for the TW patent application 108128522 (no English translation is available) dated Nov. 19, 2020 (27 pages).

3GPP TR 23.727 V0.2.0 (Jun. 2018), 3rd Generation Partnership Project; Technical Specification Group Services and System Aspects; Study on Application Awareness Interworking between LTE and NR (Release 16) *sections 2, 4, 5.1.1, 6.1.2, 6.3.1.1, 6.4.1*.

3GPP TS 23.122 V15.4.0 (Jun. 2018), 3rd Generation Partnership Project; Technical Specification Group Core Network and Terminals; Non-access-Stratum (NAS) function related to Mobile Station (MS) in idle mode (Release 15) *1.2, 2, 3.1, 4.4.3, 4.4.3.1, 4.4.3.1.1, 4.4.3.1.2, 4.4.3.3.1, 4.4.4*.

USPTO, office action for related U.S. Appl. No. 16/535,580 dated Dec. 22, 2020 (23 pages).

3GPP TR 24.890 V15.1.0 (Mar. 2018), 3rd Generation Partnership Project; Technical Specification Group Core Network and Terminals; 5G System—phase 1; CT WG1 Aspects (Release 15).

USPTO, the notice of allowance for related U.S. Appl. No. 16/530,152 dated Dec. 3, 2020 (13 pages).

USPTO, office action for related U.S. Appl. No. 16/535,691 dated Sep. 23, 2020 (15 pages).

USPTO, office action for related U.S. Appl. No. 16/535,730 dated Oct. 6, 2020 (14 pages).

U.S. Appl. No. 16/535,730 USPTO OA reference, 3GPP TSG-CT WG1 Meeting #109 C1-18daaa, Nokia et al., "Route selection descriptors in a URSP rule", Montreal, Canada, Feb. 26-Mar. 2, 2018 (3 pages).

International Search Report and Written Opinion of International Search Authority for PCT/CN2019/099905 dated Nov. 19, 2019 (10 pages).

R3-171125 3GPP TSG-RAN WG2 #95bis, Nokia et al., "PDU Session Modification Procedure", Spokane, USA, Apr. 3-7, 2017 (3 pages).

International Search Report and Written Opinion of International Search Authority for PCT/CN2019/100200 dated Nov. 14, 2019 (9 pages).

(56) References Cited

OTHER PUBLICATIONS

3GPP TS 23.503 V1.0.0 (Dec. 2012), 3rd Generation Partnership Project; Technical Specification Group Services and System Aspects; Policy and Charging Control Framework for the 5G System; Stage 2 (Release 15) *see 4.2.2 and 6.1.2*.
USPTO, office action for related U.S. Appl. No. 16/535,691 dated Feb. 4, 2020 (12 pages).
International Search Report and Written Opinion of International Search Authority for PCT/CN2019/100199 dated Oct. 30, 2019 (8 pages).
3GPP TS 23.502 V15.2.0 (Jun. 2018), 3rd Generation Partnership Project; Technical Specification Group Services and System Aspects; Procedures for the 5G System; Stage 2 (Release 15) *pp. 55-63, 125-128*.
C1-173057 3GPP TSG-CT WG1 Meeting #105, Huawei et al., "5GSM message for PDU session anchor relocation for SSC mode 2 and SSC mode 3", Krakow, Poland, Aug. 21-25, 2017 (5 pages).
International Search Report and Written Opinion of International Search Authority for PCT/CN2019/100218 dated Nov. 4, 2019 (9 pages).
Taiwan IPO, office action for the TW patent application 108128518 (no English translation is available) dated Jul. 10, 2020 (10 pages).
3GPP TR 24.890 V15.1.0 (Mar. 2018), 3rd Generation Partnership Project; Technical Specification Group Core Network and Terminals; 5G System—phase 1; CT WG1 Aspects (Release 15) *sections 6.1, 8.5.1.2.7, 8.5.1.3.2.1.1.3, 8.5.3.1.1, 8.5.3.1.2, 8.5.3.2.2.1, 8.5.3.2.2.3, 9.3.4, 9.5.3.1, 9.5.3.2, 10.3.2*
USPTO, office action U.S. Appl. No. 16/535,580 dated Aug. 4, 2020 (18 pages).
USPTO, office action for related U.S. Appl. No. 16/535,691 dated Apr. 19, 2021 (22 pages).

ENHANCED 5GSM STATE MAPPING WHEN INTERWORKING

CROSS REFERENCE TO RELATED APPLICATIONS

This application claims priority under 35 U.S.C. § 119 from U.S. Provisional Application No. 62/717,352, entitled "Performance Enhancement in 5G System", filed on Aug. 10, 2018, the subject matter of which is incorporated herein by reference.

TECHNICAL FIELD

The disclosed embodiments relate generally to wireless communication, and, more particularly, to method of supporting 5G session management (5GSM) state mapping during inter-system change between 5GS and EPS.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. With the optimization of the network design, many improvements have developed over the evolution of various standards. The Next Generation Mobile Network (NGMN) board, has decided to focus the future NGMN activities on defining the end-to-end requirements for 5G new radio (NR) systems.

In 5G/NR, a Protocol Data Unit (PDU) session defines the association between the UE and the data network that provides a PDU connectivity service. Each PDU session is identified by a PDU session ID (PSI), and may include multiple QoS flows and QoS rules. The 5G session management (5GSM) procedure maintains a state machine for different 5GSM sublayer states for PDU session handling in the UE. There are five different 5GSM sublayer states for PDU session handling in the state machine: PDU session active, PDU session active pending, PDU session inactive, PDU session inactive pending, and PDU session modification pending.

The 5G PDU session establishment is a parallel procedure of Packet Data Network (PDN) connection (bearer procedure in 4G/LTE. Each PDN includes an Access Point Name (APN) network identifier that defines the PDN to which the UE requests connectivity, and may also include an APN operator identifier that defines in which Public Land Mobile Network (PLMN) the PDN Gateway is located. In 4G/LTE, the evolved packet system (EPS) session management (ESM) procedure maintains a state machine for different ESM sublayer states for EPS bearer context handling in the UE. There are two different ESM sublayer states for EPS bearer handling in the state machine: bearer context active and bearer context inactive.

During inter-system change from 5GS to EPS, if the PDU session is in 5GSM state PDU session inactive pending, then it will be mapped to ESM state bearer context inactive in the current art. However, without completing the PDU session release procedure, the PDU session may still be valid. Mapping a valid PDU session to an inactive EPS bearer thus creates a problem.

SUMMARY

A method of 5G session management (5GSM) state mapping is proposed when interworking. For each PDU session in 5GSM state of PDU SESSION active, PDU SESSION MODIFICATION PENDING, or PDU SESSION INACTIVE PENDING, E maps the PDU session to a PDN connection in 4G ESM state BEARER CONTEXT ACTIVE. For any other PDU session in 5GSM state of PDU SESSION inactive, or PDU SESSION ACTIVE PENDING, UE maps the PDU session to a PDN connection in 4G ESM state BEARER CONTEXT INACTIVE. When a UE attempts to release a PDU session, the PDU session goes to a PDU SESSION INACTIVE PENDING state from PDU SESSION ACTIVE state. The PDU session is still valid before being completely released by a PDU session release procedure. Therefore, if an inter-system change from 5GS to EPS happens before the PDU session being completely released, then the PDU SESSION INACTIVE PENDING state of the PDU session should be mapped to a BEARER CONTEXT ACTIVE state of a corresponding PDN connection.

In one embodiment, a UE establishing a Protocol Data Unit (PDU) session in a 5G network, wherein the PDU session has a PDU session identifier (PSI). The UE transmits a PDU session release request message to the 5G network and transitioning from a 5G session management (5GSM) PDU session active state to a 5GSM PDU session inactive pending state. The UE performs an inter-system change from a 5G system (5GS) to a 4G evolved packet system (EPS). The UE maps the 5GSM PDU session inactive pending state to an EPS session management (ESM) bearer context active state of one or more mapped EPS bearer contexts such that the PDU session having the PSI is transferred to a PDN connection in the 4G EPS.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
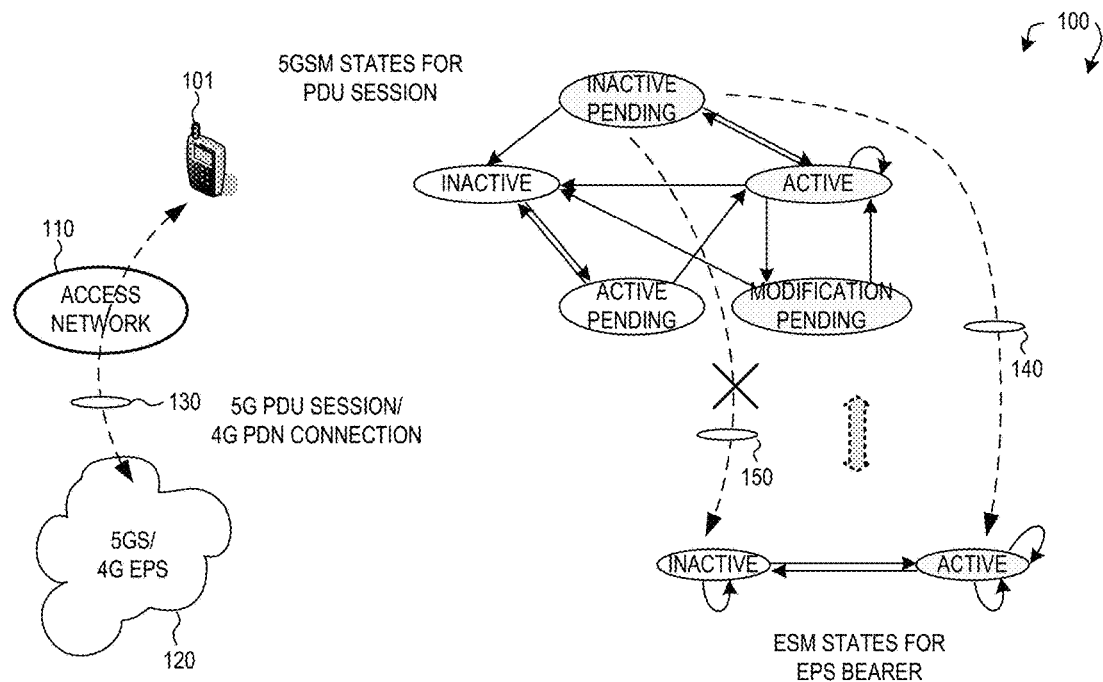
FIG. 1 illustrates an exemplary wireless mobile communication system with both 5G new radio (NR) network and 4G LTE network supporting inter-system change and session management (SM) state mapping in accordance with one novel aspect.

FIG. 1 illustrates an exemplary wireless mobile communication system 100 with both 5G new radio (NR) network and 4G LTE network supporting inter-system change and session management (SM) state mapping in accordance with one novel aspect. Mobile communication system 100 comprises a core network CN 120 including a 5G core network (5GCN) for 5G NR system (5GS) and a 4G evolved packet core (EPC) for 4G LTE Evolved Packet System (EPS) that provide various services by communicating with a plurality of user equipments (UEs) including UE 101 via an access network 110. For example, application servers and a packet data network gateway (PDN GW or P-GW) belong to part of the core network CN 120. UE 101 and its serving base station BS belong to part of a radio access network RAN 110 that provides radio access for UE 101 via a radio access technology (RAT). An Access and Mobility Management Function (AMF) communicates with the BS, serving GW and PDN GW for access and mobility management of wireless access devices in mobile communication network 100. A Session Management Function (SMF) is primarily responsible for interacting with the decoupled data plane, creating, updating and removing Protocol Data Unit (PDU) sessions and managing session context with the User Plane Function (UPF). UE 101 may be equipped with a radio frequency (RF) transceiver or multiple RF transceivers for different application services via different RATs/CNs. UE 101 may be a smart phone, a wearable device, an Internet of Things (IoT) device, and a tablet, etc.

In 5G/NR, a PDU session defines the association between the UE and the data network that provides a PDU connectivity service. Each PDU session is identified by a PDU session ID (PSI), and may include multiple QoS flows and QoS rules. The 5G session management (5GSM) procedure maintains a state machine for different 5GSM sublayer states (per PDU session) for PDU session handling in the UE. There are five different 5GSM sublayer states for PDU session handling: PDU session active, PDU session active pending, PDU session inactive, PDU session inactive pending, and PDU session modification pending.

The 5G PDU session establishment is a parallel procedure of Packet Data Network (PDN) connection (bearer) procedure in 4G/LIE. Each PDN includes an Access Point Name (APN) network identifier that defines the PDN to which the UE requests connectivity, and may also include an APN operator identifier that defines in which Public Land Mobile Network (PLMN) the PDN Gateway is located. In 4G/LTE, the evolved packet system (EPS) session management (ESM) procedure maintains a state machine for different ESM sublayer states (per EPS bearer context) for PDN connection handling in the UE. There are two different ESM sub layer states for EPS bearer handling: bearer context active and bearer context inactive.

During inter-system change from 5GS to EPS, if the PDU session is in 5GSM state PDU session inactive pending, then it will be mapped to ESM state bearer context inactive in the current art (150). However, without completing the PDU session release procedure, the PDU session may still be valid. Mapping a valid PDU session to an inactive EPS bearer thus creates a problem. In accordance with one novel aspect, for each PDU session in 5GSM state of PDU SESSION active, PDU SESSION MODIFICATION PENDING, or PDU SESSION INACTIVE PENDING, UE should map the PDU session to a PDN connection in 4G ESM state BEARER CONTEXT ACTIVE. Any other PDU session in 5GSM state of PDU SESSION inactive, or PDU SESSION ACTIVE PENDING, UE should map the PDU session to a PDN connection in 4G ESM state BEARER CONTEXT INACTIVE.

In the example of FIG. 1, after UE 101 establishes a PDU session 130 in 5GS, the PDU session may be in different 5GSM sublayer states depending on different operations. Later on, UE Intends to release the PDU session, and the PDU session goes to a 5GSM state of PDU session inactive pending. However, the PDU session release procedure is not completed before an inter-system change from 5GS to EPS is triggered. If the PDU session stays in the 5GSM state of inactive pending at the time of the inter-system change, then UE 101 maps the PDU session to a PDN connection having a 4G ESM state of bearer context active, as depicted by 140.

Figure 2:
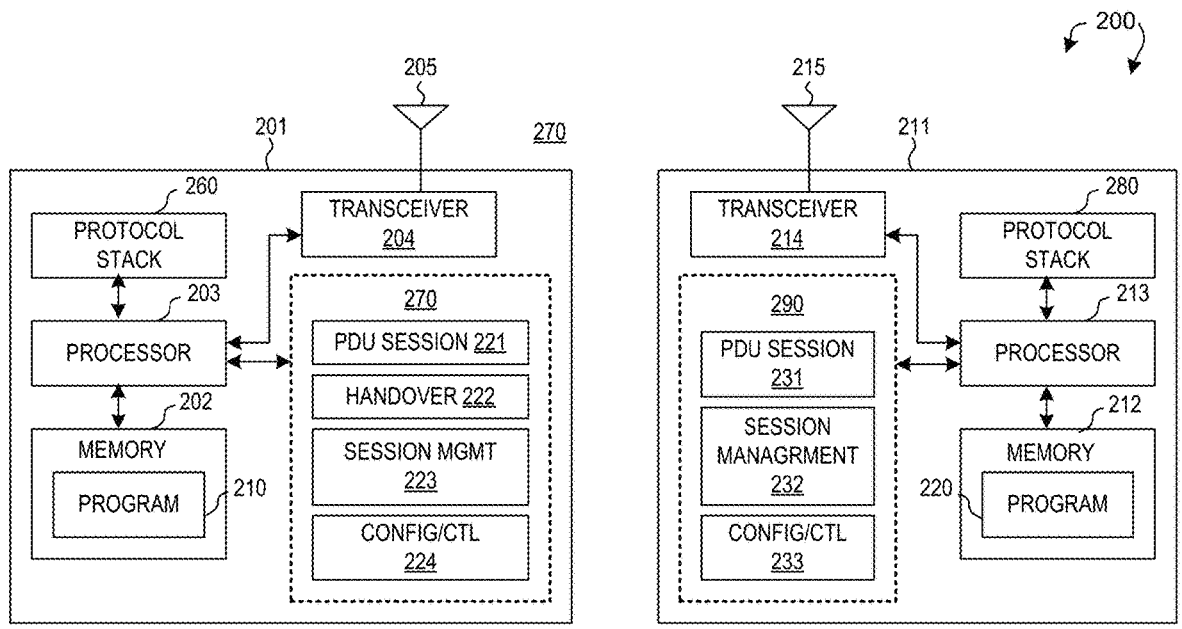
FIG. 2 illustrates simplified block diagrams of a user equipment (UE) and a base station in accordance with embodiments of the current invention.

FIG. 2 illustrates simplified block diagrams of wireless devices, e.g., a UE 201 and network entity 211 in accordance with embodiments of the current invention. Network entity 211 may be a base station combined with an MME or AMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes a set of control functional modules and circuit 290. PDU session/PDN connection handling circuit 231 handles PDU session and PDN connection establishment and modification procedures. Session management circuit 232 maintains a state machine for different 5GSM sublayer states for PDU session handling, and different 4G ESM sublayer states for EPS bearer context handling. Configuration and control circuit 233 provides different parameters to configure and control UE.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also comprises a set of functional modules and control circuits to carry out functional tasks of UE 201. Protocol stacks 260 comprise Non-Access-Stratum (NAS) layer to communicate with an MME or an AMF entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network. In one example, system modules and circuits 270 comprise PDU session handling circuit 221 that performs PDU session/PDN connection establishment and modification procedures with the network, a handover circuit 222 that performs intra-system and inter-system handover, a session management circuit 223 that maintains a state machine for different 5GSM sublayer states for PDU session handling, and different 4G ESM sublayer states for EPS bearer context handling, and a config and control circuit 224 that handles configuration and control parameters from the network.

Figure 3:
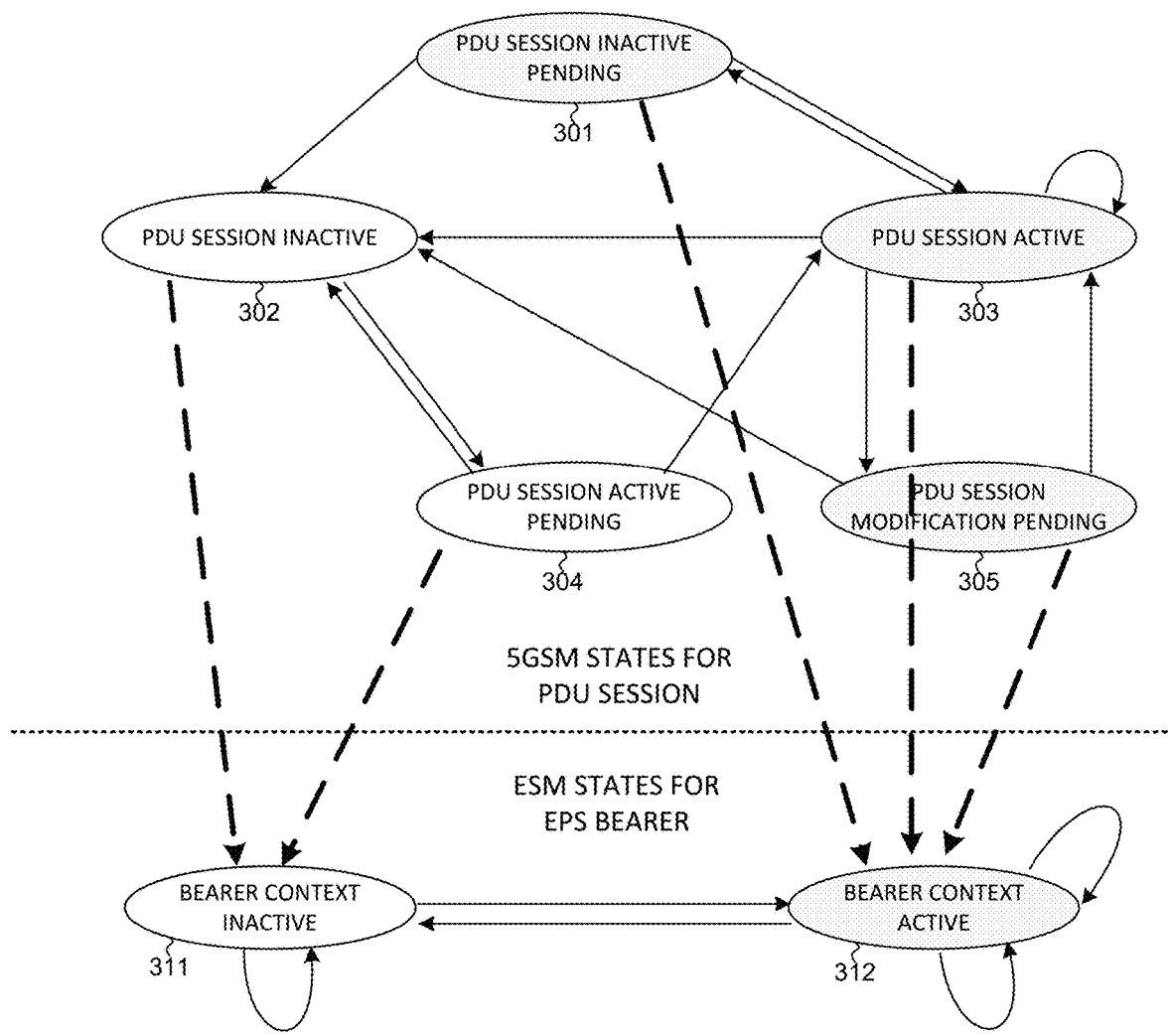
FIG. 3 illustrates embodiments of inter-system change and state mapping between 5GSM states for PDU session and ESM states for EPS bearer in accordance with embodiments of the current invention.

FIG. 3 illustrates embodiments of inter-system change and state mapping between 5GSM states for PDU session and ESM states for EPS bearer in accordance with embodiments of the current invention. The 5G session management (5GSM) procedure maintains a state machine for different 5GSM sublayer states for PDU session handling in the UE. For each PDU session, a UE can be in many different 5GSM states at different stages of the PDU session establishment and modification procedure. From PDU session inactive pending state (301), UE can go to PDU session inactive state (302) if UE receives a PDU SESSION RELEASE COMMAND message, UE can also go to PDU session active state (303) if UE receives a PDU SESSION RELEASE REJECT message. From PDU session inactive state (302), UE can go to PDU session active pending state (304) when UE sends out a PDU SESSION ESTABLISHMENT REQUEST message. From PDU session active pending state (304), UE can go to PDU session inactive if UE receives a PDU SESSION ESTABLISHMENT REJECT message, UE can also go to PDU session active state (303) if UE receives PDU SESSION ESTABLISHMENT ACCEPT message. From PDU session active state (303), UE can possibly go to other three states or remain in active state. For example, UE can go to PDU session modification pending state (305) when UE sends out a PDU SESSION MODIFICATION REQUEST message. From PDU session modification pending state (305), UE can go to PDU session inactive state (302) if UE receives a PDU SESSION MODIFICATION REJECT message, UE can go to PDU session active state (303) if UE receives a PDU SESSION MODIFICATION COMMAND message or a PDU SESSION MODIFICATION REJECT message.

Note that this state machine does not illustrates all possible UE states and associated state transactions for the PDU session and procedures. However, the state machine defines some of the UE behaviors when UE is in certain states and receives or sends certain 5GSM messages. For example, from PDU session active state (303), UE can go to PDU session inactive pending state (301) when UE sends out a PDU SESSION RELEASE REQUEST message. The PDU session release procedure is completed only after UE receives a PDU SESSION RELEASE COMMAND message and goes to PDU session inactive state (302). When an inter-system change from 5GS to EPS happens during the PDU session release procedure, it is possible that UE is still in PDU session inactive pending state for the PDU session, which should still be valid after the inter-system change.

The EPS session management (ESM) procedure maintains a state machine for different. ESM sublayer states for PDN connection and EPS bearer handling in the UE. For each PDN connection, a UE can be in many different ESM states at different stages of the PDN connection establishment and modification procedure. There are two different ESM sublayer states for PDN connection and EPS bearer handling in the state machine: bearer context active (state 311) and bearer context inactive (312). When a UE is handover from 5GS to EPS, each PDU session with a 5GSM state needs to be mapped to a PDN connection with a corresponding ESM state. In the example of FIG. 3, for each PDU session in 5GSM state of PDU SESSION ACTIVE, PDU SESSION MODIFICATION PENDING, or PDU SESSION INACTIVE PENDING, UE should map the PDU session to a PDN connection in 4G ESM state BEARER CONTEXT ACTIVE. Any other PDU session in 5GSM state of PDU SESSION INACTIVE, or PDU SESSION ACTIVE PENDING, UE should map the PDU session to a PDN connection in 4G ESM state BEARER CONTEXT INACTIVE.

Figure 4:
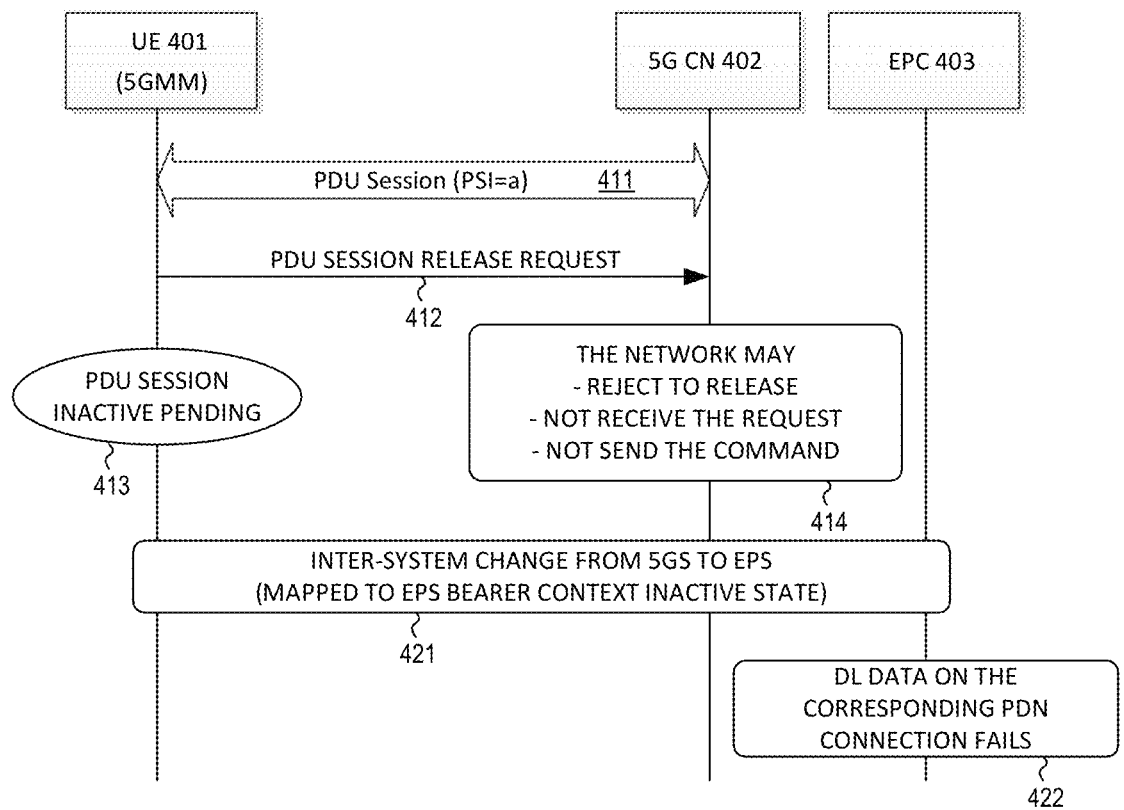
FIG. 4 illustrates a sequence flow of a first embodiment of SM state mapping after inter-system change from 5GS to EPS.

FIG. 4 illustrates a sequence flow of a first embodiment of SM state mapping after inter-system change from 5GS to EPS. In step 411, UE 401 is served in 5GS and establishes a PDU session with a 5GCN 402. The PDU session has a PDU session identifier PSI=a, and the PDU session has a 5GSM sublayer state PDU SESSION ACTIVE. In step 412, UE 402 sends a PDU session release request message in an attempt to release the PDU session and triggers a PDU session release procedure. The PDU session then changes to a 5GSM sublayer state PDU SESSION INACTIVE PENDING, as depicted by step 413, before the PDU session release procedure is completed. If UE 402 receives a PDU session release command message from the network, then the PDU session will change to PDU SESSION INACTIVE state. If UE 402 receives a PDU session release reject message from the network, however, then the PDU session will change to PDU SESSION ACTIVE state.

During the PDU session release procedure, many different scenarios can happen (step 414): 1) the network has not received the PDU session release request message from the UE; 2) the network may reject the PDU session release request by sending a PDU session release reject message which is not received by the UE or not yet send a PDU session release reject request; 3) the network received the PDU session release request message, but has not yet sent a PDU session release command message to the UE; and 4) the network has sent a PDU session release command message, but the UE has not received the command message from the network. In any of the above scenario, the PDU session release procedure is not completed, and the PDU session is still in PDU SESSION INACTIVE PENDING state.

Meanwhile, an inter-system change from 5GS to EPS is triggered (step 421) before the PDU session release procedure is completed. Inter-system change can be triggered by the network (e.g., by handover procedure, or redirection procedure) or by UE itself (e.g., by cell reselection procedure). The UE can detect that the new serving cell is only connected to the other core network (e.g., from 5G CN to EPC), thus triggers inter-system change procedure accordingly. The UE also changes the NAS version between N1 mode (NAS protocol for 5GS) and S1 mode (NAS protocol for EPS). In the embodiment of FIG. 4, the PDU session is mapped to one or more EPS bearer contexts having an EPS BEARER CONTEXT INACTIVE state of a PDN connection. As a result, UE 401 does not have any active EPS bearer contexts for the PDN connection with EPC 403, and any downlink data on the corresponding EPS bearer contexts fails because the EPS bearer contexts are inactive.

Figure 5:
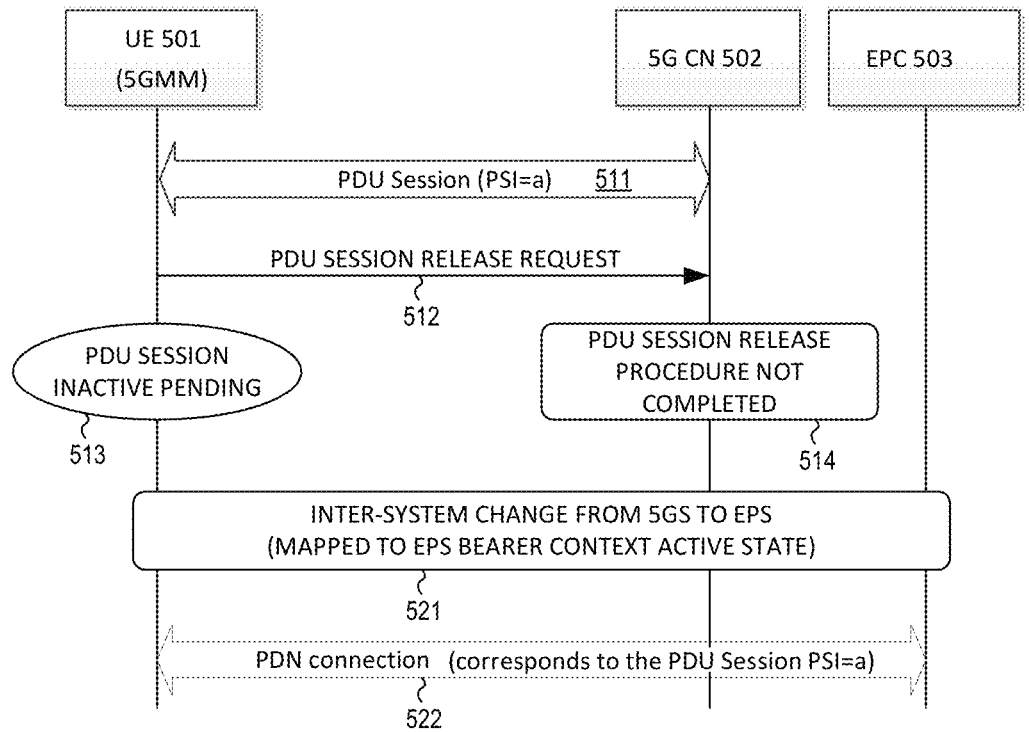
FIG. 5 illustrates a sequence flow of a second embodiment of SM state mapping after inter-system change from 5GS to EPS.

FIG. 5 illustrates a sequence flow of a second embodiment of SM state mapping after inter-system change from 5GS to EPS. Steps 511-514 of FIG. 5 are similar to steps 411-414 of FIG. 4. In the embodiment of FIG. 5, in step 521, when an inter-system change from 5GS to EPS is triggered before the PDU session release procedure is completed, the PDU session is mapped to one or more corresponding EPS bearer contexts having an EPS BEARER STATE ACTIVE state of a PDN connection. As a result, UE 501 is connected to EPC 503 over the active EPS bearer contexts of a PDN connection that corresponds to the original PDU session having PSI=a.

Figure 6:
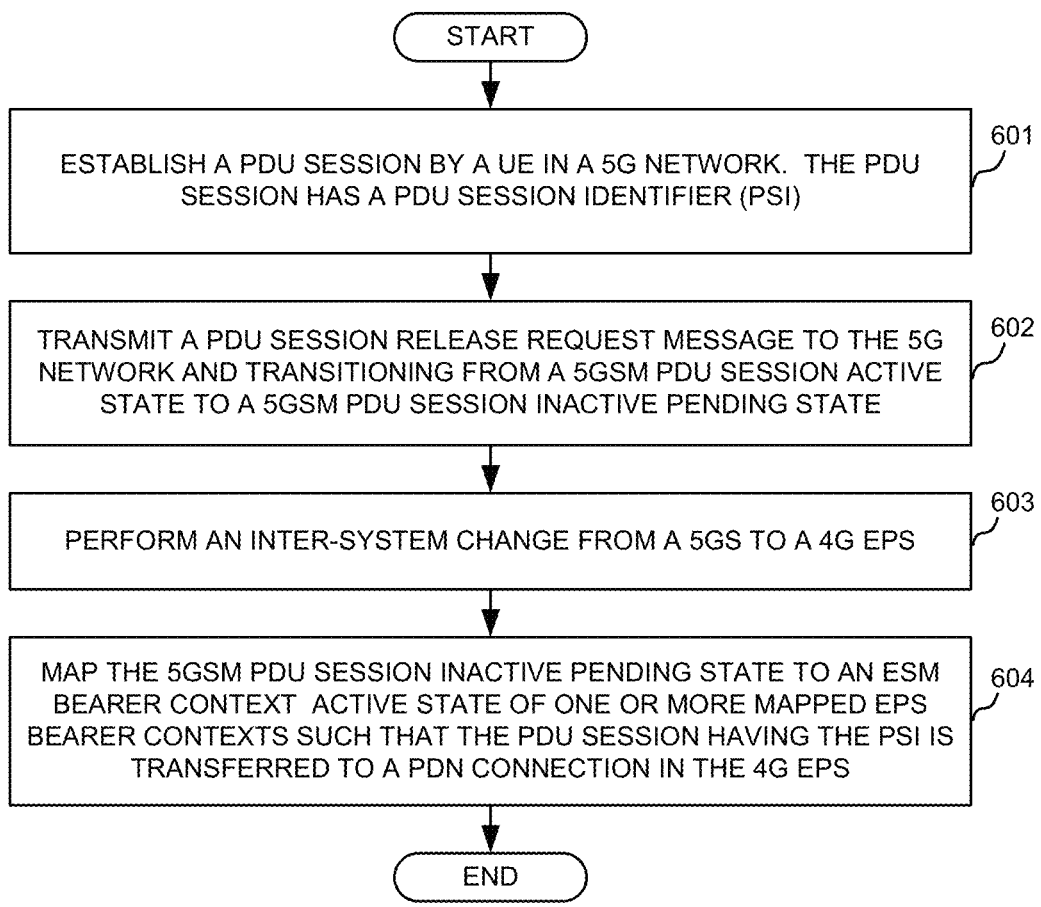
FIG. 6 is a flow chart of a method of supporting session management state mapping from 5GS to EPS in accordance with one novel aspect.

FIG. 6 is a flow chart of a method of supporting session management state mapping from 5GS to EPS in accordance with one novel aspect. In step 601, a UE establishing a Protocol Data Unit (PDU) session in a 5G network, wherein the PDU session has a PDU session identifier (PSI). In step 602, the UE transmits a PDU session release request message to the 5G network and transitioning from a 5G session management (5GSM) PDU session active state to a 5GSM PDU session inactive pending state. In step 603, the UE performs an inter-system change from a 5G system (5GS) to a 4G evolved packet system (EPS). In step 604, the UE maps the 5GSM PDU session inactive pending state to an EPS session management (ESM) bearer context active state of mapped EPS bearer contexts such that the PDU session having the PSI is transferred to a PDN connection in the 4G EPS.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   establishing a Protocol Data Unit (PDU) session by a user equipment (UE) in a 5G network, wherein the PDU session has a PDU session identifier (PSI);
   transmitting a PDU session release request message to the 5G network and transitioning from a 5G session management (5GSM) PDU session active state to a 5GSM PDU session inactive pending state;
   performing an inter-system change from a 5G system (5GS) to a 4G evolved packet system (EPS); and
   mapping the 5GSM PDU session inactive pending state to an EPS session management (ESM) bearer context active state of one or more mapped EPS bearer contexts such that the PDU session having the PSI is transferred to a PDN connection in the 4G EPS.

2. The method of claim 1, wherein a PDU session release procedure triggered by the PDU session release request message is not completed before the inter-system change from the 5GS to the 4G EPS.

3. The method of claim 2, wherein the 5G network did not receive the PDU session release request message before the inter-system change.

4. The method of claim 2, wherein the 5G network rejects the PDU session release request message before the inter-system change.

5. The method of claim 2, wherein the UE does not receive a PDU session release command message or a PDU session release reject message from the network before the inter-system change.

6. The method of claim 1, wherein the UE maintains a state machine for 5GSM sublayer states including: PDU session active, PDU session inactive, PDU session active pending, PDU session inactive pending, and PDU session modification pending.

7. The method of claim 1, wherein the UE maintains a state machine for 4G ESM sublayer states including: bearer context active and bearer context inactive.

8. The method of claim 1, wherein the UE maps 5GSM state of PDU session active, PDU session modification pending, or PDU session inactive pending to ESM state of EPS bearer context active.

9. The method of claim 1, wherein the UE maps 5GSM state of PDU session inactive or PDU session active pending to ESM state of EPS bearer context inactive.

10. The method of claim 1, wherein the UE continues to transmit or receive data over the PDN connection in the 4G EPS.

11. A User Equipment (UE), comprising:
    a Protocol Data Unit (PDU) session handling circuit that establishes a PDU session in a 5G network, wherein the PDU session has a PDU session identifier (PSI);
    a transmitter that transmits a PDU session release request message to the 5G network and transitioning from a 5G session management (5GSM) PDU session active state to a 5GSM PDU session inactive pending state;
    an inter-system handover circuit that performs an inter-system change from a 5G system (5GS) to a 4G evolved packet system (EPS); and
    a session management circuit that maps the 5GSM PDU session inactive pending state to an EPS session management (ESM) bearer context active state of one or more mapped EPS bearer contexts such that the PDU session having the PSI is transferred to a PDN connection in the 4G EPS.

12. The UE of claim 11, wherein a PDU session release procedure triggered by the PDU session release request message is not completed before the inter-system change from the 5GS to the 4G EPS.

13. The UE of claim 12, wherein the 5G network did not receive the PDU session release request message before the inter-system change.

14. The UE of claim 12, wherein the 5G network rejects the PDU session release request message before the inter-system change.

15. The UE of claim 12, wherein the UE does not receive a PDU session release command message or a PDU session release reject message from the network before the inter-system change.

16. The UE of claim 11, wherein the UE maintains a state machine for 5GSM sublayer states including: PDU session active, PDU session inactive, PDU session active pending, PDU session inactive pending, and PDU session modification pending.

17. The UE of claim 11, wherein the UE maintains a state machine for 4G ESM sublayer states including: bearer context active and bearer context inactive.

18. The UE of claim 11, wherein the UE maps 5GSM state of PDU session active, PDU session modification pending, or PDU session inactive pending to ESM state of EPS bearer context active.

19. The UE of claim 11, wherein the UE maps 5GSM state of PDU session inactive or PDU session active pending to ESM state of EPS bearer context inactive.

20. The UE of claim 11, wherein the UE continues to transmit or receive data over the PDN connection in the 4G EPS.

\* \* \* \* \*